United States Patent [19]
Barry et al.

[11] 4,450,489
[45] May 22, 1984

[54] FLOATING DISC PHOTOCONDUCTIVE FILM READER

[75] Inventors: James D. Barry, Los Angeles; Joseph M. Denney, Palos Verdes, both of Calif.

[73] Assignee: Hughes Aircraft Company, El Segundo, Calif.

[21] Appl. No.: 334,945

[22] Filed: Dec. 28, 1981

[51] Int. Cl.³ .............................................. H04N 5/86
[52] U.S. Cl. .................................... 358/348; 346/155
[58] Field of Search ....................... 358/335, 346, 348; 369/151, 135, 126; 346/133.1, 155; 360/102, 107, 103, 84

[56] References Cited

U.S. PATENT DOCUMENTS

| | | | |
|---|---|---|---|
| 2,743,318 | 4/1956 | De Forest | 360/84 |
| 2,876,295 | 3/1959 | Irby | 360/84 |
| 2,900,444 | 8/1959 | Camras | 360/107 |
| 2,932,548 | 4/1960 | Nau et al. | 346/155 |
| 3,320,371 | 5/1967 | Bach | 360/84 |
| 3,903,594 | 9/1975 | Koneval | 345/155 |
| 4,125,854 | 11/1978 | Kirtikar | 346/155 |
| 4,137,536 | 1/1979 | Hinz et al. | 346/155 |
| 4,254,424 | 3/1981 | Landheer et al. | 346/155 |

Primary Examiner—Donald E. McElheny, Jr.
Attorney, Agent, or Firm—C. L. Anderson; W. J. Bethurum; A. W. Karambelas

[57] ABSTRACT

A photoconductive film reader comprises a disc with a read head attached to its bottom surface at an edge point and rotated over the photoconductive film at a sufficiently high velocity so that the read head floats aerodynamically on the film, the read head having means for sensing the information stored as electrostatic charge on the film. The film has a reset strip of a predetermined amount of charge prerecorded along one of its edges, resetting of the read head electronics being coincident with the passage of the read head over the reset strip. The floatation of the read head on the film reduces the effect of film modulations on the film-to-read head spacing and allows the spacing to be well defined and controllable.

12 Claims, 8 Drawing Figures

FLOATING DISC PHOTOCONDUCTIVE FILM READER

TECHNICAL FIELD

This invention is related to devices for reading images recorded on photoconductive film of the type comprising a plastic strip with a photoconductive crystalline layer deposited upon the top side of the strip.

BACKGROUND OF THE INVENTION

Photoconductive recording film of the type useful for recording motion pictures is made by combining a plastic film substrate of the same type as used for motion picture film but with a photoconductive layer rather than a silver-halide layer. During the formation of the plastic film strip, a crystalline photosensitive substance such as cadmium sulfide is deposited upon the plastic strip in a continuous layer. When the film is exposed in an appropriate manner to an optical image, the photosensitive layer upon the film accumulates an electrostatic charge proportional to the flux of incident light from the image. Specifically, when recording an image, the accumulated charge determines the gray level of the image. This may be compared to normal film where silver grains interact with light to form silver-halides and their density determines the gray level of the image. The density or grain size of the cadmium sulfide on photoconductive film is related to its resolution rather than the gray level. The resolution of the image recorded on the photoconductive film is limited only by two factors: the imaging of the film and the recovery of the image. The limit to the imaging is dominated by the grain size of the cadmium sulfide or photosensitive crystal layer upon the film, and the resolution of the optics used to focus the image onto the film. The recovery of the image is limited by the size of the sensor used to measure the charge density over the film. One example of photoconductive film which is commercially available is Kodak Photoconductive Recording Film, SO-101 which may be purchased from Kodak Film Company, Rochester, New York.

After an image is recorded onto the photoconductive film strip, the image may be read out by passing the film over a device which senses the electrostatic charge accumulated in the photosensitive layer. For example, a plurality of microscopic charge sensing electrodes arranged in a linear array extending across the width of the film may be used to measure the charge density in the line form as the film is moved longitudinally past this linear array of electrodes. In a like manner, charge sensing electrodes could be arranged in a 2-dimensional pattern in such a manner that the image could be recovered at a later time by appropriate juxtaposition of the various measured values at each point over the array. The charge sensing electrodes can be termed "floating" because their electrical potentials are permitted to float so as to follow the amount of static charge in the underlying film. The change in the floating potential of each one of the electrodes represents the static charge accumulated in the photosensitive layer of the film in the region beneath the floating electrode. Thus, each floating electrode corresponds to an individual area element or pixel, each frame or image recorded on the film being divided into a plurality of such pixels. The voltage at each one of the floating electrodes is sensed in an output electronic device which generates a video signal therefrom.

Several difficulties exist with such a read out device. First, the production of such a line or area array of microscopic sense electrodes with proper and constant geometrical positioning is extremely difficult to achieve. Secondly, the distance between the film surface and each sense electrode within the array of floating electrodes is difficult to control. The amplitude of the signal generated by each of the floating electrodes varies as the reciprocal of the distance between the film and the floating electrode. Therefore, the inability to control the film-to-floating electrode distance reduces the ability to accurately measure the charge at each pixel.

Another difficulty with the planar array read out device is that the floating electrodes must be periodically reset to a known potential in order to minimize the effect of unavoidable change of drift in the voltage of each of the floating electrodes. Even in the absence of the photoconductive film, the voltage of some of the floating electrodes may drift thereby yielding errors in the recovered image. The problem may be avoided by prerecording reset strips across the width of the film at periodic intervals along the length thereof, the reset strips each having a predetermined amount of static charge density. The linear space or distance between the reset strips is determined by the electronic time constant associated with the decay or drift of the sensing electrodes and the speed at which the film is moved past the electrode array. An electronic circuit resets the potential of each of the floating electrodes just as each reset strip passes beneath them. The image is recorded between adjacent reset strips on the film. The disadvantage of this method for resetting the floating electrodes is that each reset strip occupies a region of the film which would otherwise be occupied by the image, so that this loss significantly reduces the amount of information which may be recorded on a given length of photoconductive film and, furthermore, periodically interrupts the information sensed by the charge sensing electrodes.

The purpose of the present invention is to solve the problems of uncontrolled variations in film-to-readout sensor array distance, the interruption of recorded film information due to the presence of the periodic reset strips along the length of the film, and the elimination of the difficult geometrical arrangement for the sense electrodes on a readout array.

SUMMARY OF THE INVENTION

The invention includes a high speed rotating disc having one or more reader heads located on its lower face near the edge and placed above the photoconductive film such that the film moves longitudinally under the disc as it rotates. The disc is rotated at a sufficiently high speed so that the reader head floats aerodynamically on top of the film. The reader head may be composed of, for example, a linear array of N-sense electrodes. The sense electrode may be the floating electrodes to a charge coupled device (CCD) produced for this purpose. The disc rotation rate is set so that as it makes one revolution, the reader head reads an area on the film specified by n-pixel elements long and across the arc width of the film. An arc width is read since the reader head is located on a circular path as the film passes below. The motion of the film and the speed of the disc are adjusted so that successive read out areas are adjacent to one another and virtually no area of the film is missed by the motion of the read out head. In the present invention, a reset strip (if needed) is placed continuously along one or both of the longitudinal edges of the photoconductive recording film, rather than across the width of the film at periodic intervals. The voltage of each of the charge coupled device floating electrodes is thereby reset each time the floating electrode crosses over the reset strip at the edge of the film.

The speed of the disc and hence the film speed is selected so that each image pixel is read out through the charge coupled device (CCD) at a particular video frequency controlled by an external electronic video system connected to the disc read out head. Furthermore, the rotational velocity of the disc is sufficient to form an aerodynamic boundary layer between the bottom face of the reader head and the film on which the head floats. Typically, the disc rotates at a rate on the order of 100 to 300 revolutions per minute.

One significant advantage of the invention is that the aerodynamic boundary layer between the reader head and the film maintains a constant distance between the read out head and the film. Furthermore, even if the film has "wrinkles" or non-uniformities at its surface facing the disc, the reader head will follow these topological non-uniformities due to the action of the boundary layer so that the film-to-readout head distance is maintained virtually constant despite such undulations in the film. The space between the rotating disc and the film may be 1 to 5 mil while the space between the aerodynamic reader head and the film will be as close as dictated by electrostatics and the size of the pixel size desired. For example, 25 $\mu$m pixel dimensions would require a reader head to film distance of about 25 $\mu$m.

Another advantage of the invention is that the read out head moves transversely with respect to the longitudinal direction of the film so that there is no necessity for placing the reset strip across the width of the film. Instead, placement of the reset strip along one or both of the longitudinal film edges removes the problem of interruption of recorded information in the film.

BRIEF DESCRIPTION OF THE DRAWINGS

The invention is best understood by reference to the accompanying drawings of which:

FIG. 1b is a plan view of a reader head used in the method illustrated in FIG. 1a.

FIG. 4b is a schematic diagram illustrating, in cross-sectional view, each of the unit cells of the charge coupled device floating electrode sensor array of FIG. 4a;

FIG. 5b is an enlarged view corresponding to FIG. 5a and illustrating the placement of the read out head in the disc of FIG. 5a.

DETAILED DESCRIPTION OF THE INVENTION

Figure 1A:
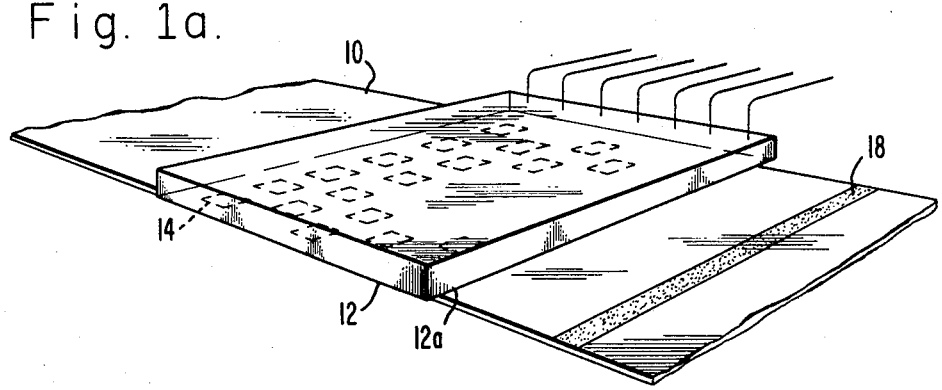
FIG. 1a illustrates one method of reading photoconductive film.
Figure 1B:
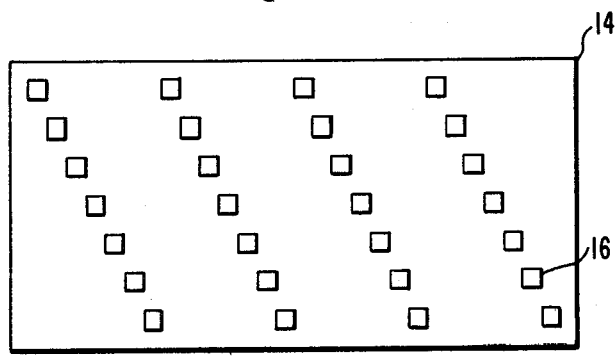

FIG. 1a illustrates a method for reading a strip of photoconductive film 10 comprising a plastic material having deposited thereon a layer of crystalline photoconductive material such as cadmium sulfide. The photoconductive film may be Kodak Photoconductive Recording Film SO-101 or equivalent. The film is moved lengthwise beneath a read out head 12 comprising a plurality of integrated microelectronic circuits or "chips" 14 formed on the bottom face 12a of the read out head 12. Each of the microelectonic chips 14 includes a plurality of floating sense electrodes 16, illustrated in FIG. 1b, which face the film strip 10. The electric potential of each of the sense electrodes 16 floats so that it changes with variations in the static charge stored in the underlying region of the film 10. These changes are sensed by a circuit connected to each electrode, such as a charge coupled device of the type well known in the art. Charge coupled devices are described, for example, in Sequin et al, *Charge Transfer Devices*, Academic Press, New York, 1975. The chip 14 thus embodies read out electronics which generate a video output signal fed to computer storage with subsequent data manipulation and display electronics (not shown).

The data resulting from this read function must first be placed within a 2-dimensional matrix in a computer, and the data rearranged to form a true image and then fed to the display. The sense electrodes 16 are placed in a staggered row on the reader head 14 as a result of the physical size of the sense electrodes and the basic cell size of an individual charge coupled device (CCD). The CCD cell size may be $1 \times 4$ mil while the sense electrode size may be 25 $\mu$m square.

The spacing between the bottom surface 12a of the read out head 12 and the film 10 is difficult to maintain due to the dimensions required. In general, the spacing must be equal to or less than the pixel dimension due to the electrostatic physics of the situation. In addition, the sensitivity is greatly affected by changes in the spacing, and close tolerances on spacing control are needed. Therefore, the voltage of each of the sense electrodes 16 may vary for a given amount of static charge accumulated on the photoconductive film 10 if the individual spacings are not equal. Secondly, the potential of each of the sense electrodes 16 may drift with time. Therefore, each of the sense electrodes 16 must have its floating potential reset periodically, requiring that a plurality of transversely extending reset strips 18 having a predetermined static charge density be placed periodically along the length of the film 10. Electronic circuitry resets the potential of each of the electrodes 16 to a known level just as one film reset strip passes beneath the reader head 12. The placement of the reset strips 18 reduces the amount of information recorded on the film 10 and periodically interrupts the information sensed by the reader head 12.

Figure 2:
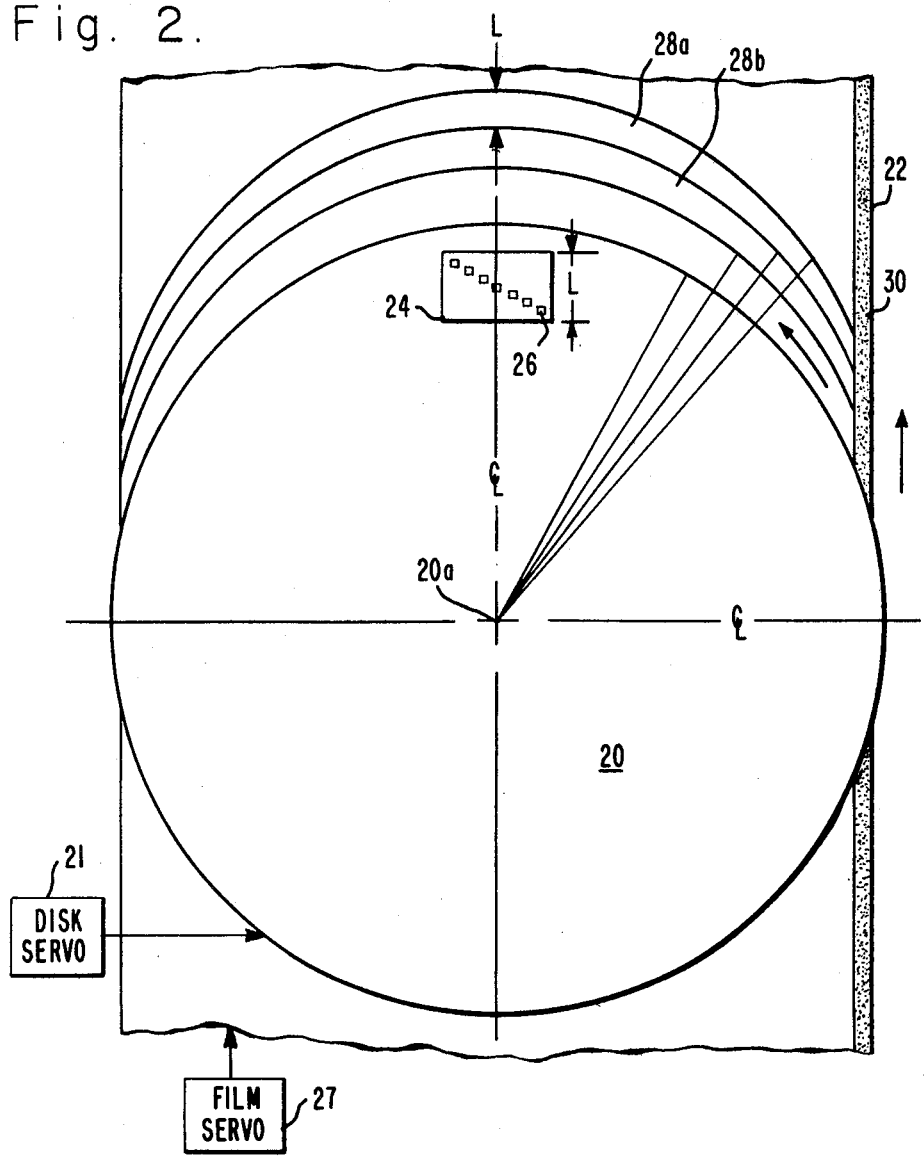
FIG. 2 is a simplified plan view of the present invention including the rotating disc and photoconductive film.

In the embodiment illustrated in FIG. 2, a disc 20 rotates under control of a disc servo 21 over a strip of photoconductive film 22 at a sufficiently high speed to form an aerodynamic boundary layer between the reader head 24 on the disc and the film so that the reader head actually aerodynamically floats on the film. The boundary layer gas or liquid may be a constant part of the environment or may be artifically created by ejecting gas or liquid through appropriate vents in the disc. A reader head 24, which may comprise a single microelectronic chip, is placed near the edge of the disc 20, and may include a plurality of charge coupled device floating sense electrodes 26 extending diagonally across the chip 24. More than one reader head may be placed at the edge of the disc. If two or more are used, they must be positioned equidistant about the circular disc base while maintaining a chord separation slightly greater than the width of the film. The description that follows will use a single reader head for simplicity. As the disc 20 rotates about its axis 20a, the photoconductive film 22 is moved longitudinally beneath it under control of a film servo 27 at a selected velocity $V_{film}$. The rotational velocity $V_{disc}$ of the disc 20 is on the order of about 100 to 300 rpm, which is sufficient, in the presence of a gaseous (or fluid) medium, to form an aerodynamic boundary layer between the reader head 24 and the film 22 upon which the reader head 24 may aerodynamically float. The film speed, $V_{film}$ and the disc rotational speed, $V_{disc}$, are each selected so that the read head or chip 24 sweeps out precisely adjacent arcuate read out areas 28a, 28b, etc. with successive revolutions of the disc. Thus, the read out chip 24 eventually covers the entire film 22 as it moves beneath the rotating disc 20. A reset strip 30 is placed along one longitudinal edge of the film strip 22. Each floating electrode 26 has its potential reset (if necessary) just as it passes over the film reset strip 30. The reset strip 30 is prerecorded with a selected static charge density along the entire length of the film 22.

One of the main advantages of the invention is that the distance between the sense electrodes 26 and the film 22 is precisely regulated by the floatation of the reader head 24 on the aerodynamic boundary layer formed between it and the film 22. Another advantage is that placement of the reset strip 30 along the one longitudinal edge of the film 22, which is made possible by the rotational motion of the disc 20, eliminates any necessity for transversely extending reset strips. Thus, interruption of information sensed by the read out head 24 and reduction in density of information stored on the film 22 is eliminated in this invention.

Figure 3:
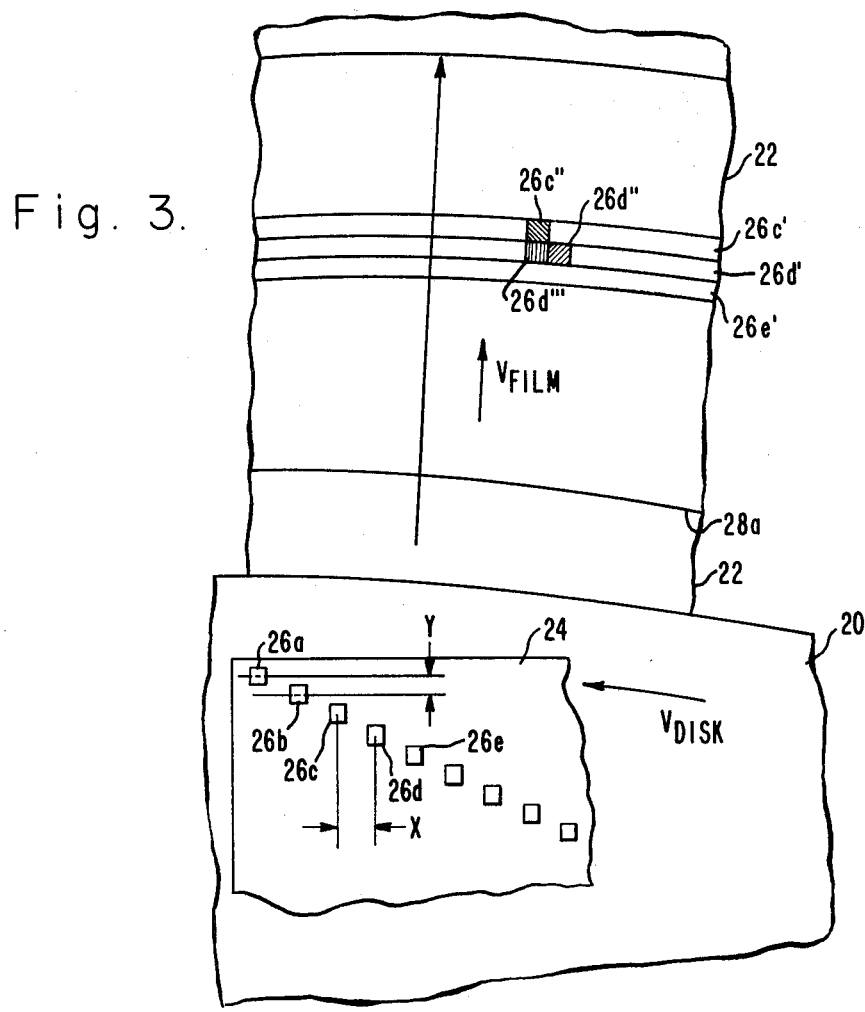
FIG. 3 is an enlarged plan view of the read out head on the photoconductive disc of FIG. 2 illustrating the placement of the charge coupled device floating electrodes thereof.

FIG. 3 illustrates the placement of each of the individual floating electrodes 26 on the chip 24. The sensing electrodes 26a, b, c, d, e, etc., are offset radially by a center-to-center spacing Y, which is equal to the width of the electrodes. The sense electrodes 26a–e are also offset from one another circumferentially by a displacement X on the order of the width of each unit cell of a charge coupled device array formed on the chip 24. This is best illustrated in FIG. 4a, which shows that the microelectronic chip 24 comprises a plurality of charge coupled device unit cells 32a, b, c, d, etc. Each of the charge coupled device unit cells 32 of FIG. 4a corresponds to the partial schematic cross-sectional view of FIG. 4b.

Figure 4B:
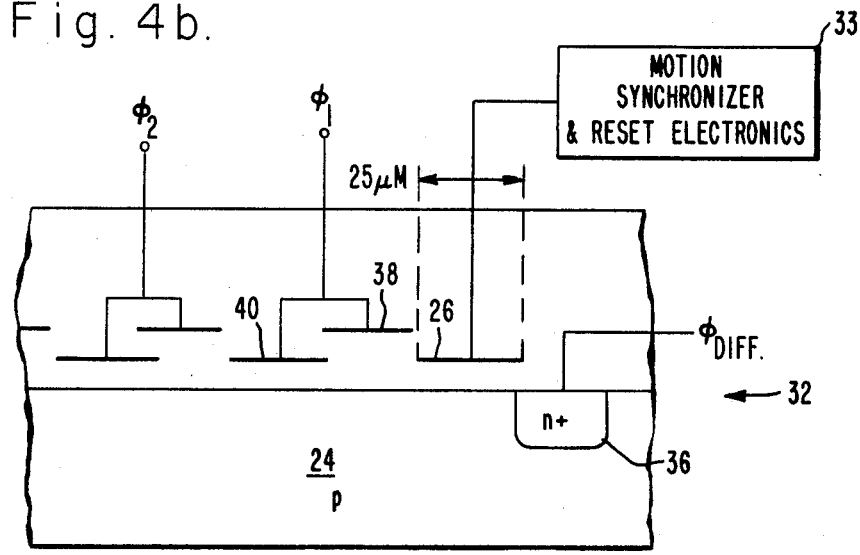
Figure 4A:
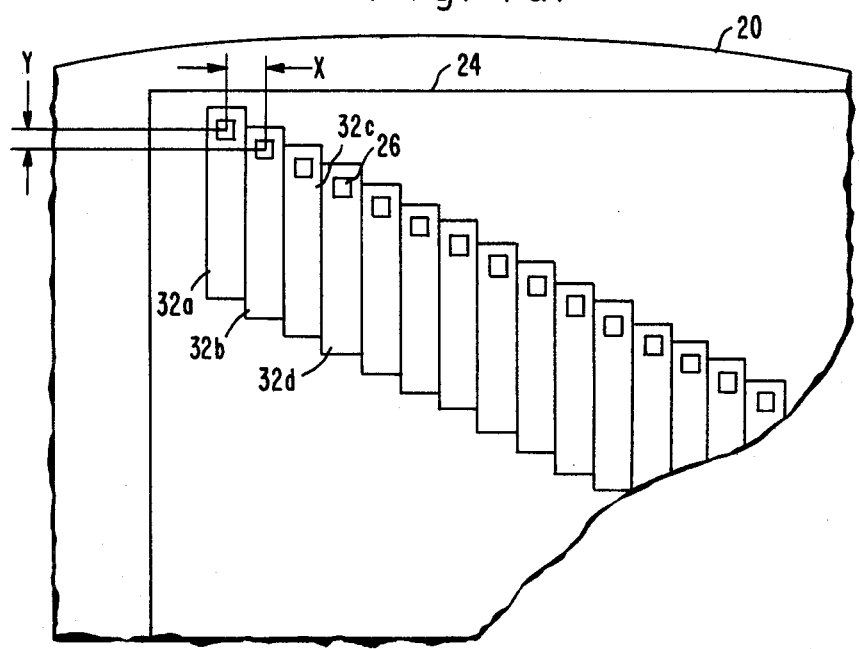
FIG. 4a is a plan view of a portion of a semiconductor substrate comprising part of the floating gate electrode array of FIG. 3.

FIG. 4b illustrates a CCD unit cell formed on a portion of the chip 24 which may be of p-type conductivity, an input diffusion 36 of n-type conductivity, the floating sense electrode 26, a plurality of upper and lower level polycrystalline silicon electrodes 38, 40, respectively, connected together in adjacent pairs to receive a set of complementary two phase CCD clock signals $\phi_1$, $\phi_2$ in alternate pairs, in the usual manner. The floating sense electrode 26 is connected to reset circuitry 33 synchronized with the motion of the disc 20 so as to cause the potential of the floating electrode 26 to be reset each time it passes over the reset strip 30 on the film 22. The input diffusion 36 is connected to receive a clock signal $\phi_{diff}$. The clock signals $\phi_{diff}$, $\phi_1$ and $\phi_2$ are operated in the manner of a charge coupled device charge input circuit described in the above referenced Sequin publication, and need not be described further herein.

The length and width of each of the sense electrodes 26 is defined by the desired spatial sensitivity and is generally assumed to be on the order of 25 micrometers. Referring again to FIG. 3, each of the sense electrodes 26c, 26d, 26e, etc., sweeps out its own individual read out path 26c', 26d', 26e', etc., respectively, which, taken together, comprise the read out path 28a illustrated in FIG. 2, Each individual read out path 26c', 26d', etc., of each electrode is comprised of a plurality of pixels 26c'', 26d'', etc., respectively, each being 25 micrometers square. The CCD clock signals $\phi_1$, $\phi_2$, $\phi_{diff}$ are synchronized so that, in each succeeding CCD clock period successive pixels on the film are "read" by an individual sense electrode. For example, during one CCD clock period, the sense electrode 26d reads the pixel 26d''. In the very next CCD clock period, the sense electrode 26d reads the adjacent pixel 26d''' on the film 22. In each CCD clock period, as each pixel is read, a CCD charge packet is injected from the input diffusion 36 beneath the sense electrode 26 and the electrodes 38, 40, the size of the charge packet being determined by the potential of the sense electrode 26, which, in turn, is proportional to the amount of static charge stored in the particular pixel on the film 22 underlying the floating electrode 26 at that instant. As a result, a serial succession of charge packets is generated in each unit CCD cell, comprising a video signal representing the image recorded on the film pixel line 26d. The full video charge image on the film 22 is reconstructed by redisplaying the line by line signals in an appropriate manner (not shown).

Figure 5A:
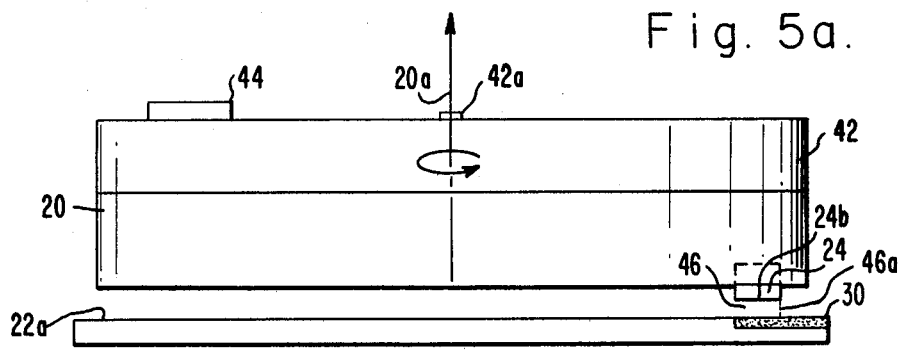
FIG. 5a is a cross-sectional view of the read out disc of FIG. 2.

The disc 20 and film 22 are shown in cross-sectional view in FIG. 5a. The reader chip 24 is located at the bottom face 20b near the perimeter of the disc 20. Read out electronics 42 may be placed on top of the disc 20 and may include means 42a such as a light emitting diode for generating a modulated optical output signal representative of the video signal read out from the film 22. Thus, the only required electrical contact to the disc is a single contact to provide electrical power. Of course, even this single electrical contact may be dispensed with by the substitution of a solar cell 44 over a portion of the electronics 42, the solar cell converting light into electrical power which is supplied to the electronics 42.

Figure 5B:
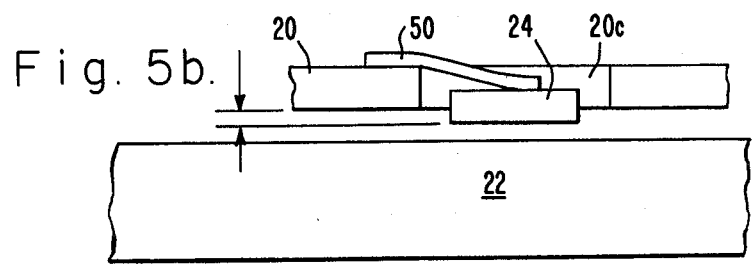

The disc servo 21 rotates the disc 20 about its axis 20a at a sufficiently high speed (on the order of 100 to 300 rpm) so that an aerodynamic boundary layer 46 is formed between the bottom face of the reader chip 24 and the top surface 22a of the film 22. As illustrated in FIG. 5b, a leaf spring 50 or other mechanical suspension maintains the read out chip 24 in an aperture 20c formed in the bottom surface 20b of the disc 20.

The aerodynamic boundary layer 46 formed by the high speed motion of the disc 20 is, in accordance with well known aerodynamic theory, analogous to a layer of gas which "sticks" to the film and is nearly incompressible. It has a steep velocity profile, meaning that there is an abrupt change in relative aerodynamic velocity at the edge 46a of the boundary layer 46, so that the boundary layer 46 is very well defined. The function of the leaf spring or mechanical suspension 50 is to permit the reader chip 24 itself to float on the boundary layer 46.

Preferably, the disc 20 is formed of aluminum and the leaf spring 50 if formed of stainless steel or an alloy of beryllium copper. The reader head 24 is composed of a head portion into which the sense electrode chip is placed. Electrical contact between the CCD structure and the electronics 42 is made by appropriate wiring through an access hole in the disc 20. The bottom surface 24b of the reader head or chip 24 has a slightly convex shape in order to provide the aerodynamic lift, although a skilled worker may experiment to determine the optimum configuration of the bottom surface 24b for the surface characteristics of the particular film 22 and reader head or chip 24 selected.

Timing

Synchronism of the operation of the charge coupled device floating electrodes 26 with the film movement and disc rotation will now be described with relationship to a particular example. In this example using FIG. 3, it is assumed that there are N=100 sense electrodes 26 in the reader chip 24. Furthermore, it is assumed that the output electronics 42 require that the charge coupled device (surface channel) be operated at a clocking frequency of 10 megahertz. This means that each individual floating sense electrode will be clocked at a rate of 10 megahertz$\div$N or 100 kilohertz. Furthermore, it is assumed that the maximum image resolution which can be read out from the film corresponds to an individual pixel dimension of 25 micrometers in length and width, so that each of the sense electrodes 26 has a square configuration of 25 micrometers on each side. Furthermore, it is assumed that the reader chip 24 is mounted 2.5 inches from rotational center line 20a of the disc 20, so that the film width is less than 2 inches. Wider film and more reader head chips may of course be used, but the disc diameter would change to accommodate the film and the number of chips.

Given the CCD clocking frequency of 10 MHz, the rotational speed $V_{disc}$ of the disc 20 must be such that each sense electrode 26 successively overlies an adjacent 25 micrometer square image pixel on the film 22 every second. This requires that the tangential movement of the chip 24 cover 25 micrometers every $1 \times 10^{-5}$ second, which is a tangential velocity of 250 centimeters per second. The frequency of the disc rotation is equal to the tangential velocity of the read out chip 24 divided by the product of $2\pi$ and the 2.5 inch radial displacement of the reader chip 24. This frequency is easily calculated to be about 6.27 revolutions per second, or about 376 rpm.

The film speed must be selected to allow 100 pixels in the film, corresponding to the number of sense electrodes 26 in the read out chip 24, to travel a distance equal to their longitudinal extend L (see FIG. 3) beneath the disc 20 during exactly one revolution of the disc 20. Thus, the longitudinal speed $V_{film}$ of the film 22 is given by the number N of pixels in the read head (100) multiplied by the width (25 micrometers) of each pixel multiplied by the rotational frequency (6.27 revolutions per second) of the disc 20. The speed $V_{film}$ of the film is therefore on the order of 1.6 centimeters per second. The disc rotational rate $V_{disc}$ and the film speed $V_{film}$ just calculated are dependent upon the pixel size, the number of sense electrodes used on the chip, the number of chips on the disc, the diameter of the disc and the width of the film. Different values for $V_{film}$ and $V_{disc}$ will result when different values of the parameters are selected.

Variations of the invention not specifically described herein may be made by a skilled worker without departing from the spirit and scope of the invention. As an example, the electronic circuitry associated with each sense electrode 26 may be implemented as a transistorized microcircuit, rather than the charge coupled device described previously. In addition, an electro-optical material (such as a liquid crystal) may be used instead of the floating electrodes 26. Read out of the electro-optical material may be accomplished optically by probing it with a beam such as a laser beam and measuring reflection, transmission or polarization related amplitude changes.

What is claimed is:

1. In a photoconductive film reader for reading a filmstrip having electrostatically recorded information, the combination comprising:
   a disc having a bottom face, said disc rotatable over said film at a sufficiently high rate so that said bottom face may float upon said filmstrip in the presence of a fluid or gaseous medium, wherein said filmstrip is moveable beneath said disc; and
   a read head attached to said disc at said bottom face, and including means for sensing electrostatic charge stored in said filmstrip.

2. In a film reader for reading electrostatically recorded information from a planar filmstrip, the combination comprising:
   a disc having a bottom surface facing said flat filmstrip, said disc being rotatable about its axis in the presence of a gaseous or fluid medium over said film at a sufficiently high rate so that a dynamic boundary layer of said medium is formed between said disc bottom surface and said filmstrip upon which said disc may float, said filmstrip being moveable beneath said disc; and
   a read head attached to said disc at said bottom face, including means for sensing electrostatic charge stored in said filmstrip.

3. A film reader for reading electrostatically recorded information from a filmstrip, comprising:
   a rotatable disc having a bottom surface facing said filmstrip;
   a read head attached to said disc at said bottom face, and including means for sensing electrostatic charge stored in said filmstrip;
   means for rotating said disc at a sufficiently high rate so that said read head floats upon said filmstrip; and
   means for moving said filmstrip longitudinally beneath said disc.

4. The reader of claims 1, 2 or 3 wherein said recorded information on said filmstrip comprises a plurality of individual pixels of a particular area, and wherein said read head comprises a plurality of floating electrodes each having a floating electrical potential and an area corresponding to said particular area of said pixels, wherein the electrical potential of each of said floating electrodes responds to static charge stored in the pixel underlying each of said floating electrodes.

5. The reader of claims 1, 2 or 3 wherein said information recorded onto said filmstrip is divisible into a plurality of pixels, each of said pixels being of the same area, and wherein said read head comprises a plurality of floating electrodes each being of the same area and having an electrical potential which is responsive to the amount of charge stored in said film at successively underlying ones of said pixels, wherein said plurality of floating electrodes are scanned by a read out device at a clocking frequency F, and wherein said rotational rate of said disc and the velocity of the motion of said film are selected such that said read head sweeps out adjacent read out areas across the width of said film with each revolution of said disc.

6. The reader of claims 1, 2 or 3 wherein said read head is located on said disc away from the axis of rotation of said disc and wherein the rate of the disc rotation and the rate of the film movement are selected so that said read head sweeps out adjacent arcuate read out areas across the width of said film with each revolution of said disc.

7. The reader of claims 1, 2 or 3 wherein a reset strip of a predetermined amount of electrostatic charge is recorded along one longitudinal edge of said filmstrip, said reader further comprising means for resetting said sensing means each time said read head passes over said reset strip, whereby the information recorded on said filmstrip is uninterrupted along the length thereof.

8. The reader of claims 1, 2 or 3 further comprising means synchronized with the rotation of said disc for resetting said sensing means.

9. The reader of claims 1, 2 or 3 wherein said sensing means comprises a plurality of floating electrodes formed in said reader head, said reader further comprising means synchronized with the motion of said disc for resetting the electrical potential of each of said floating electrodes whenever it is located in registration with a longitudinal edge strip of said film.

10. The reader of claims 1, 2 or 3 wherein said sensing means comprises a plurality of resettable floating electrodes formed in said read head and wherein a reset strip having a predetermined amount of electrostatic charge is prerecorded in a longitudinal strip in said film, said reader further comprising means for resetting electrical potential of each of said floating electrodes in synchronism with the motion of said disc when the floating electrode is located over said reset strip.

11. The reader of claims 1, 2 or 3 wherein floatation of said reader head upon said film is such that said reader head follows modulations in the movement of said film so that the effect of said modulations upon the spacing between said read head and said filmstrip is reduced.

12. The reader of claims 1, 2 or 3 wherein said sensing means comprises an array of floating electrodes including a plurality of charge coupled device unit cells individually connected to said electrodes.

* * * * *